(12) United States Patent
Civiero et al.

(10) Patent No.: US 10,900,139 B2
(45) Date of Patent: Jan. 26, 2021

(54) BICYCLE GEAR AND METHOD FOR MANUFACTURING SUCH A GEAR

(71) Applicant: Campagnolo S.r.l., Vicenza (IT)

(72) Inventors: Mirco Civiero, Montecchia di Crosara (IT); Paolo Fabris, Brendola (IT)

(73) Assignee: Campagnolo S.r.l., Vicenza (IT)

(*) Notice: Subject to any disclaimer, the term of this patent is extended or adjusted under 35 U.S.C. 154(b) by 249 days.

(21) Appl. No.: 15/982,356

(22) Filed: May 17, 2018

(65) Prior Publication Data
US 2018/0334755 A1  Nov. 22, 2018

(30) Foreign Application Priority Data
May 22, 2017  (IT) .................. 102017000055002

(51) Int. Cl.
| | | |
|---|---|---|
| C25D 11/20 | (2006.01) | |
| B60B 1/00 | (2006.01) | |
| C09D 5/08 | (2006.01) | |
| C09D 5/44 | (2006.01) | |
| C25D 11/00 | (2006.01) | |
| B62M 9/10 | (2006.01) | |
| C25D 11/02 | (2006.01) | |
| C25D 11/24 | (2006.01) | |
| C25D 11/04 | (2006.01) | |
| B62M 9/00 | (2006.01) | |
| C25D 13/22 | (2006.01) | |
| B29K 27/18 | (2006.01) | |
| B21D 53/86 | (2006.01) | |

(52) U.S. Cl.
CPC ............. *C25D 11/20* (2013.01); *B60B 1/003* (2013.01); *B62M 9/10* (2013.01); *B62M 9/105* (2013.01); *C09D 5/086* (2013.01); *C09D 5/4465* (2013.01); *C25D 11/005* (2013.01); *C25D 11/026* (2013.01); *C25D 11/04* (2013.01); *C25D 11/246* (2013.01); *B21D 53/86* (2013.01); *B29K 2027/18* (2013.01); *B60B 2310/621* (2013.01); *B60B 2900/141* (2013.01); *B62M 2009/005* (2013.01); *C08J 2327/18* (2013.01); *C25D 13/22* (2013.01)

(58) Field of Classification Search
CPC ............ B62M 9/105; B62M 2009/007; C25D 11/026; F16H 55/30; B60B 21/08
USPC .................................................. 474/152, 156
See application file for complete search history.

(56) References Cited

U.S. PATENT DOCUMENTS

| | | | | |
|---|---|---|---|---|
| 5,803,852 | A * | 9/1998 | Agostinelli | ............. F16G 13/06 |
| | | | | 474/161 |
| 7,824,287 | B2 * | 11/2010 | Nonoshita | ............. B62M 9/105 |
| | | | | 474/152 |

(Continued)

FOREIGN PATENT DOCUMENTS

WO  2016161559 A1  10/2016

OTHER PUBLICATIONS

Italian Search Report and Written Opinion in Italian Application No. 102017000055002, dated Feb. 6, 2018, with English translation.

*Primary Examiner* — Henry Y Liu
(74) *Attorney, Agent, or Firm* — Volpe Koenig

(57) ABSTRACT

A bicycle gear having a first coating layer obtained by a plasma electrolytic oxidation treatment and a second coating layer, overlapped on the first coating layer, that is a lubricating substance, preferably a fluoropolymer.

10 Claims, 2 Drawing Sheets

(56) References Cited

U.S. PATENT DOCUMENTS

| | | | | |
|---|---|---|---|---|
| 7,850,564 | B2* | 12/2010 | Nonoshita | B62M 9/105 474/152 |
| 9,062,758 | B2* | 6/2015 | Reiter | F16H 55/303 |
| 2001/0031596 | A1* | 10/2001 | McDonald | F16C 33/18 442/389 |
| 2005/0282672 | A1* | 12/2005 | Nonoshita | B62M 9/105 474/161 |
| 2006/0205549 | A1* | 9/2006 | Nonoshita | B62M 9/105 474/160 |
| 2007/0129193 | A1* | 6/2007 | Nonoshita | B62M 9/105 474/160 |
| 2012/0000783 | A1* | 1/2012 | Suda | C25D 11/026 205/50 |
| 2013/0184110 | A1* | 7/2013 | Reiter | F16H 55/30 474/152 |
| 2014/0178704 | A1* | 6/2014 | Fabris | F16C 11/02 428/472.2 |
| 2015/0306907 | A1* | 10/2015 | Granieri | B60B 21/08 301/6.9 |
| 2016/0097329 | A1* | 4/2016 | Shmyreva | C25D 11/026 74/606 R |
| 2016/0251499 | A1* | 9/2016 | Barra | C08K 7/20 523/218 |
| 2017/0121841 | A1* | 5/2017 | Dolan | C25D 11/024 |
| 2017/0306956 | A1* | 10/2017 | Monet | F04C 18/0269 |
| 2018/0141310 | A1* | 5/2018 | Coumans | C23C 8/36 |
| 2019/0153178 | A1* | 5/2019 | Hochstetter | C08J 5/047 |

\* cited by examiner

BICYCLE GEAR AND METHOD FOR MANUFACTURING SUCH A GEAR

CROSS REFERENCE TO RELATED APPLICATION

This application claims the benefit of Italian Patent Application No. 102017000055002, filed on May 22, 2017, which is incorporated herein by reference as if fully set forth.

FIELD OF INVENTION

The present invention relates to a bicycle gear.

The invention also relates to a method for manufacturing a bicycle gear.

The gear of the invention can be a toothed crown of a bicycle crankset or a sprocket of a bicycle sprocket assembly.

BACKGROUND

The Applicant has observed that in the field of bicycles, in particular of racing bicycles, there is a particular need to manufacture toothed crowns that are strong, light, reliable and aesthetically well finished.

In order to satisfy these requirements, there are currently on the market toothed crowns made of aluminum alloy, in particular Al 7075, comprising a surface coating layer obtained by subjecting the toothed crown to a hard anodizing treatment. The aluminum alloy allows the desired lightness and structural strength to be obtained, whereas the hard anodizing surface treatment allows the structural strength to be increased and the desired aesthetic finishing to be obtained.

The Applicant has, however, found that toothed crowns subjected to a hard anodizing treatment (as well as other types of toothed crowns treated with electroless nickel) have some criticalities at the respective teeth.

In particular, the Applicant has found that, in the absence of special provisions, the profile of the teeth of the aforementioned toothed crowns tends to change over time due to the wear caused by the periodic contact with the chain of the bicycle during pedaling. Such a change of profile of the teeth leads to a high risk of the chain dropping in the case of high stresses deriving from jumps or rough terrain.

The Applicant has therefore felt the need to subject the toothed crowns to a surface treatment suitable for giving the teeth high resistance to wear, so as to ensure geometric constancy over time of the profile of the teeth.

The Applicant has found that it is possible to satisfy such a requirement by subjecting the toothed crown to a plasma electrolytic oxidation treatment, hereinafter also indicated with the expression "PEO treatment" (Plasma Electrolytic Oxidation).

The Applicant has, however, observed that toothed crowns subjected to a PEO treatment have high surface roughness, which inevitably results in high friction, during pedaling, between teeth of the toothed crown and inner links of the chain. Due to such friction, there is both a reduction in smoothness in the transmission of motion between toothed crown and chain and an increase in wear of the inner links of the chain at the contact areas with the teeth of the toothed crown.

A further drawback associated with the high friction between toothed crown and chain is the one known as "chainsuck". Such a phenomenon, which often occurs after traveling a few hundred miles on the road, consists of at least partial engagement of the toothed crown with the chain also by at least the tooth that precedes the one that, in the absence of sucking, is the tooth of first engagement with the chain and/or of at least the tooth that follows the one that, in the absence of sucking, is the tooth of last engagement with the chain. This results in a greater tensile stress exerted by the chain on the sprockets of the rear gearshift of the bicycle. Such a stress can be of a magnitude such as to damage the rear gearshift.

SUMMARY

The Applicant has felt the need to make a gear that, in addition to have high resistance to wear, so as to ensure geometric constancy over time of the profile of the teeth, has a particularly low friction coefficient on the outer surface thereof, so as to ensure high smoothness in the transmission of motion to the chain, low wear of the chain, and reduced risk that the "chainsuck" phenomenon occurs.

In order to fully satisfy such a requirement, the Applicant has thought to subject the gear to a PEO treatment and, thereafter, to apply a lubricating substance onto the gear thus treated.

According to the Applicant, the PEO treatment increases the resistance to wear of the teeth of the gear, thus making it possible to ensure the desired geometric constancy over time of the profile of the teeth, in such a way eliminating (or drastically reducing) the risk of the chain dropping during pedaling. The subsequent application of the lubricating substance reduces the friction between teeth of the gear and chain during pedaling, thus making it possible to ensure the desired smoothness in the transmission of motion to the chain, moreover reducing the wear of the latter and the risk of "chainsuck".

BRIEF DESCRIPTION OF THE DRAWING(S)

The features and advantages of the present invention will become clearer from the following description of some preferred embodiments thereof, made hereinafter, for indicating and not limiting purposes, with reference to the attached drawings. In such drawings.

DETAILED DESCRIPTION OF THE PREFERRED EMBODIMENTS

Figure 1:
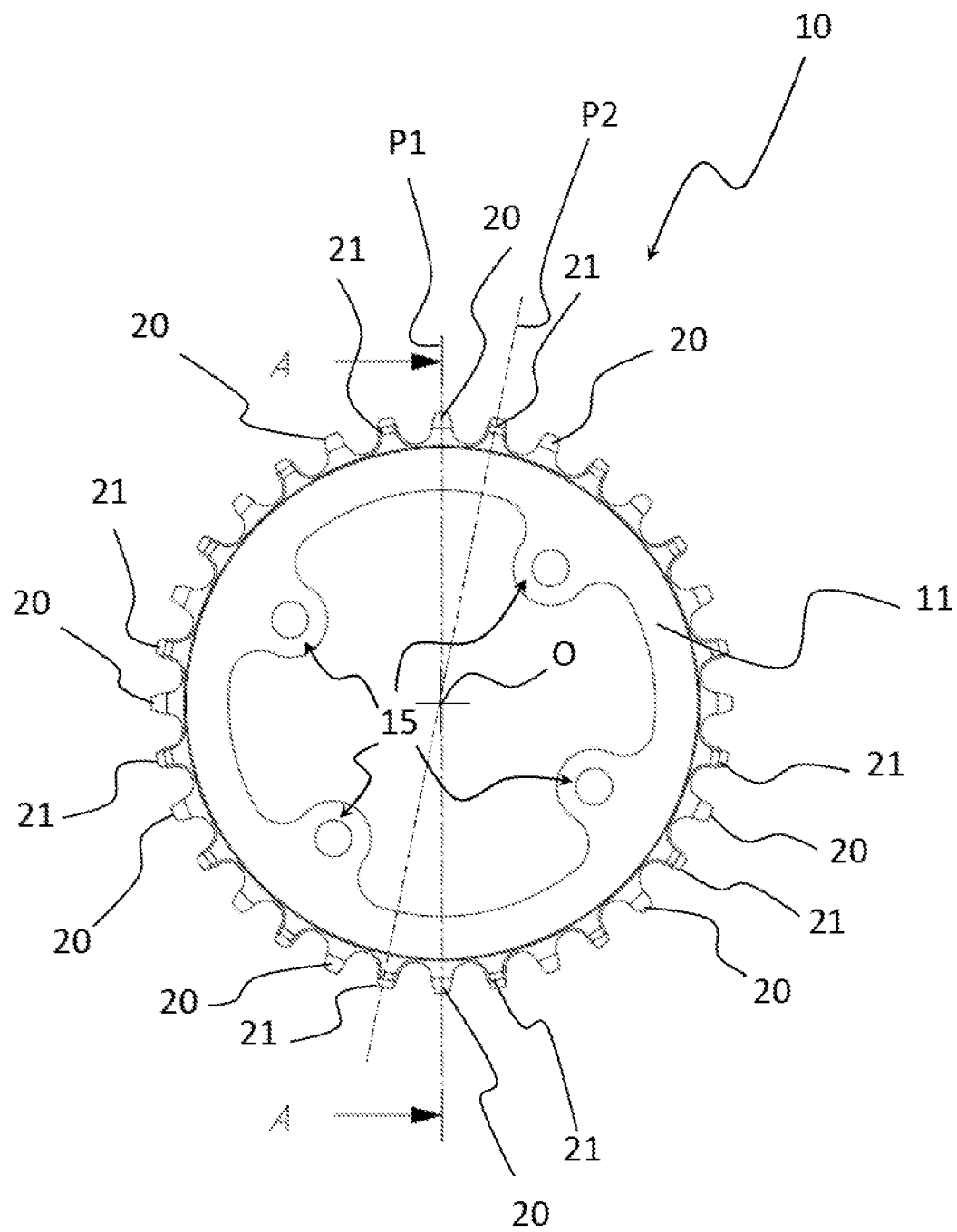
FIG. 1 is a schematic front view of a gear in accordance with the present invention.

Throughout the present description and in the following claims explicit reference will be made to a toothed crown of a crankset, preferably the single toothed crown of the crankset (single crankset). What is described and claimed in any case also applies to any toothed crown, preferably to each toothed crown, of a crankset comprising two toothed crowns (double crankset) or three toothed crowns (triple crankset) or more than three toothed crowns.

The present invention, in a first aspect thereof, relates to a bicycle gear comprising a toothed annular element having a first coating layer obtained by subjecting said toothed annular element to a plasma electrolytic oxidation treatment (PEO), characterized in that it comprises a second coating layer overlapped to said first coating layer and comprising a lubricating substance.

The actuation of the PEO treatment and the subsequent application of a lubricating substance thus make it possible to improve performance in terms of resistance to wear of the gear (and of the chain engaged on the gear) both with respect to gears subjected to hard anodizing treatment and with respect to gears subjected to a PEO treatment without subsequent application of lubricating substance.

Advantageously, the application of the lubricating substance also makes it possible to give the gear the desired surface finishing, in such a way reaching the standards required by the market and/or by the Applicant. Due to such a surface finishing there is furthermore a drastic reduction in the noise caused by the engagement of the teeth of the gear with the chain and a drastic reduction of the burden of periodic cleaning of the gear to remove the dirt held on the surface thereof.

Preferably, the second coating layer comprises an anti-corrosive substance.

More preferably, said lubricating substance is an anti-corrosive substance.

Preferably, said lubricating substance comprises an organic polymer.

Preferably, said organic polymer comprises a fluoropolymer, so as to obtain a particularly low friction coefficient on the outer surface of the toothed crown.

Preferably, said lubricating substance further comprises an organic matrix acting as a binder for said fluoropolymer.

Preferably, said organic matrix comprises an organic polymer, more preferably a polyurethane polymer.

In a first embodiment thereof, the gear of the invention is a toothed crown of a bicycle crankset.

Preferably, said toothed crown has a number of teeth comprised between 28 and 44, the extreme values being included.

Preferably, said toothed crown is made of a non-ferrous metallic material, so as to be particularly light.

Preferably, said non-ferrous metallic material comprises aluminum or an aluminum alloy, preferably Al 7075, so as to obtain both the desired lightness and the desired structural strength.

Preferably, said first coating layer has a thickness comprised between about 0.010 mm and about 0.080 mm, more preferably between about 0.020 mm and about 0.060 mm.

Preferably, said second coating layer has a thickness comprised between about 0.005 mm and about 0.1 mm, more preferably between about 0.015 mm and 0.040 mm.

The numerical ranges described above are deemed by the Applicant to be particularly suitable for allowing all of the advantageous technical effects discussed above to be obtained without at the same time risking to excessively increase the thickness of the teeth of the gear, in which case there would be a risk of compromising the correct engagement with the chain and the correct transmission of motion from the gear to the chain.

Preferably, said toothed annular element comprises a plurality of mutually identical first teeth and a plurality of mutually identical second teeth having a shape and/or a size different from that of the first teeth, each second tooth being interposed between two respective first teeth. The Applicant has found that such a provision makes it possible to increase the holding effect of the chain on the teeth of the gear in the different operating conditions to which the toothed crown is subjected during pedaling, thus reducing to the minimum the risk of chain dropping.

In a second embodiment of the invention, the gear of the invention is a sprocket of a sprocket assembly for a bicycle.

Preferably, said sprocket has a number of teeth greater than or equal to 20.

In a second aspect thereof, the present invention relates to a method for manufacturing a bicycle gear, comprising the following steps:

making a toothed annular element from a non-ferrous metal alloy;

subjecting said toothed annular element to a plasma electrolytic oxidation treatment;

applying a lubricating substance onto said toothed annular element thus treated.

Such a method makes it possible to obtain a gear that has all of the advantageous features discussed above.

Preferably, said lubricating substance is applied through spray painting or immersion.

Preferably, said lubricating substance comprises, before being applied on said toothed annular element, a solvent phase comprising organic solvents or, preferably, water, and an active phase dispersed in the solvent phase, said active phase comprising a fluoropolymer and an organic matrix acting as a binder for said fluoropolymer.

Preferably, said binding organic matrix comprises an organic polymer, more preferably a polyurethane polymer.

Preferably, the gear treated in accordance with the method of the second aspect of the invention has all of the structural and shape characteristics discussed above with reference to the gear of the first aspect of the invention.

In the attached figures, reference numeral 10 is used to indicate a gear in accordance with the present invention. In particular, it is a toothed crown for a crankset of a bicycle, preferably a single crankset of a racing bicycle.

The gear 10 comprises a toothed annular element 11 provided with a plurality of coupling portions 15 for coupling with a right pedal crank. In the example illustrated herein, there are four coupling portions 15 that extend radially from the toothed annular element 11 towards a rotation axis O of the gear 10.

The toothed annular element 11 comprises a plurality of teeth.

Preferably, the number of teeth is comprised between 28 and 44. In the specific example illustrated in FIG. 1 the toothed annular element 11 has 32 teeth.

Figure 2:
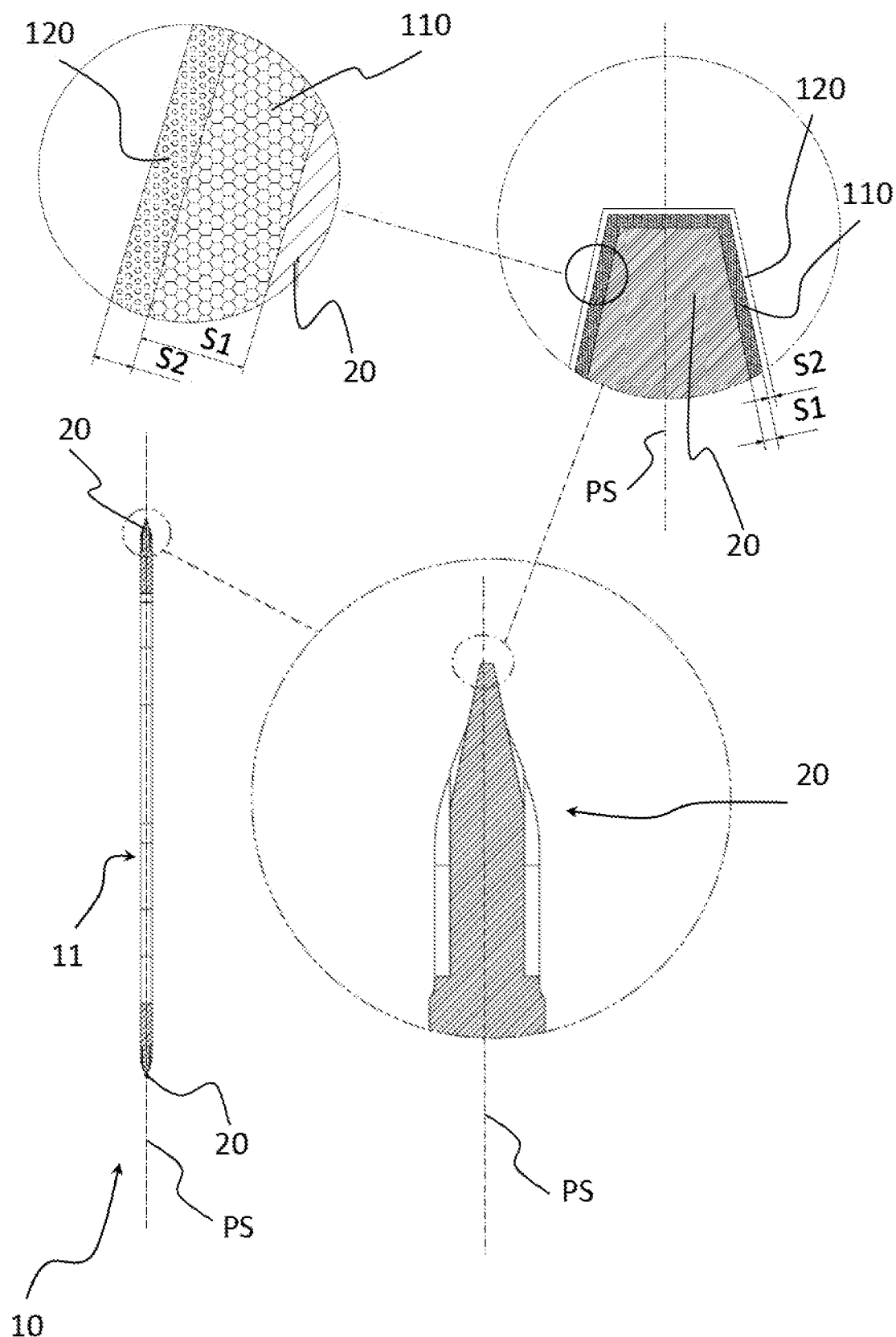
FIG. 2 is a cross section of the gear of FIG. 1, taken along the section plane A-A in FIG. 1, and of three enlarged portions of a tooth of such a gear.

In a preferred embodiment of the gear 10, such as those illustrated in FIGS. 1 and 2, the teeth of the toothed annular element 11 are not identical to each other. In particular, there is a first plurality of teeth 20 having same shape and size and a second plurality of teeth 21 having same shape and size, wherein shape and size of the second teeth 21 is different from those of the teeth 20.

In particular, the teeth 21 have substantially identical shape and size to those of the teeth 20 in the circumferential direction and different shape and size from those of the teeth 20 in the axial direction. More specifically, the thickness of the teeth 21 measured along a direction parallel to the rotation axis O is smaller than that of the teeth 20.

Each tooth 21 is interposed between two respective teeth 20, and vice-versa. Thus, the teeth alternate in the circumferential direction The vertices of the teeth 20 and 21 are all on a same plane of symmetry PS perpendicular to the rotation axis O (FIG. 2).

Each tooth 20 extends symmetrically with respect to the aforementioned plane of symmetry PS (FIG. 2) and with respect to a respective middle plane P1 on which the rotation axis O lies (FIG. 1).

Similarly, each tooth 21 extends symmetrically with respect to the aforementioned plane of symmetry PS (FIG.

2) and with respect to a respective middle plane P2 on which the rotation axis O lies (FIG. 1).

The toothed annular element 11 is preferably made of a non-ferrous metallic material, more preferably an aluminum alloy, even more preferably Al 7075.

The toothed annular element 11 is subjected to a plasma electrolytic oxidation treatment (PEO).

The PEO treatment forms a first coating layer 110 on the toothed annular element 11, including teeth 20 and 21. FIG. 2 shows such a first coating layer 110 at a tooth 20.

Preferably, the first coating layer 110 has a thickness S1 comprised between about 0.010 mm and about 0.080 mm, more preferably between about 0.020 mm and about 0.060 mm.

After having been subjected to PEO treatment, the toothed annular element 11 is coated with a lubricating substance.

Preferably, such a lubricating substance comprises an organic polymer, more preferably a fluoropolymer.

The lubricating substance forms a second coating layer 120 overlapped to the first coating layer 110. FIG. 2 shows such a second coating layer 120 at a tooth 20.

Preferably, the second coating layer 120 has a thickness S2 comprised between about 0.005 mm and about 0.10 mm, more preferably between about 0.015 mm and 0.040 mm.

Before being applied on the first coating layer 110, the lubricating substance comprises a solvent phase and an active phase dispersed in the solvent phase.

The solvent phase preferably comprises water.

As an alternative to water, the solvent phase can comprise organic solvents selected from the group comprising: hydrocarbons, alcohols, esters, ketones.

The active phase preferably comprises a fluoropolymer.

The active phase more preferably comprises also a binding organic matrix adapted to consolidate the fluoropolymer. Such an organic matrix preferably comprises an organic polymer selected from the group comprising: acrylics, epoxies, polyesters, polyurethanes, the latter being particularly preferred.

Preferably, the fluoropolymer is a polytetrafluoroethylene (PTFE), or alternatively, a perfluoroalkoxy (PFA) or fluorinated ethylene propylene (FEP).

The lubricating substance can be applied through a spray painting process or an immersion process.

The spray painting process is carried out at room temperature and provides for the toothed annular element 11 being hung at the rotation axis O thereof.

In order to ensure a constant process particularly on the thicknesses the spray is carried out with a gun controlled by a robot managed by a PLC.

The application of the lubricating substance is carried out in two coats letting it dry at room temperature for 2 minutes between one coat and the other.

Thereafter, the toothed annular element 11 with the lubricating substance applied thereon is introduced for about one hour in an oven at a temperature between 90° C. and 150° C., preferably 120° C., to dry and cross-link the lubricating substance.

The immersion process requires that the toothed annular element 11 is hung at the rotation axis O thereof and immersed in a tank comprising the solution formed of the lubricating substance, such a solution being at room temperature.

The toothed annular element 11 is immersed in the tank with a constant and slow speed (about 10 seconds for complete immersion), is held in immersion for about 2 minutes and is extracted from the aforementioned solution with a very slow constant speed (about 30 seconds for complete extraction).

Thereafter, the toothed annular element 11 is left at room temperature for about 5 minutes so as to dry the lubricating substance.

Thereafter, the toothed annular element 11 with the lubricating substance applied thereon is introduced for about one hour in an oven at a temperature between 90° C. and 150° C., preferably 120° C., to dry and cross-link the lubricating substance.

The application of the lubricating substance ensures high resistance to wear both of the gear 10 and of the chain that engages such a gear, as well as a high aesthetic finishing and a geometric constancy over time of the profile of the teeth of the gear 10, with consequent improvement in performance of the gear 10 even after prolonged road travel.

In the case in which the crankset of the bicycle has more than one toothed crown, all of the toothed crowns of the crankset are made in accordance with the present invention.

In an alternative embodiment to the one described above, the gear 10 of the present invention is a sprocket of a sprocket assembly for a bicycle.

What has been described above with reference to the toothed crown also applies to the aforementioned sprocket, unless indicated otherwise.

Preferably, such a sprocket has a number of teeth greater than 20. More preferably, all of the sprockets of the sprocket assembly that have a number of teeth greater than 20 can be made in accordance with the present invention.

Experimental Tests

Test 1

The Applicant carried out a series of experimental wear tests on toothed crowns provided with 52 teeth and intended to be used in combination with sprocket assemblies comprising 10 sprockets. In particular, the results obtained through accelerated wear tests in a machine at 300,000 cycles (equal to about 1700 Km of road travel) on toothed crowns of the Applicant made of aluminum alloy treated with electroless nickel, toothed crowns of the Applicant made of aluminum alloy treated with hard anodizing and toothed crowns of the Applicant made of aluminum alloy subjected to a PEO treatment were compared.

Such tests highlighted that the teeth of the toothed crowns treated with electroless nickel and with hard anodizing have similar wear, but are much more worn with respect to those of the toothed crowns subjected to a PEO treatment. This confirms the advantageous effects obtained through the PEO treatment in terms of resistance to wear.

The Applicant has however noted that the PEO treatment, if on the one hand it increases the useful life of the gears, on the other hand it can reduce the useful life of the chain. By analyzing the teeth of the toothed crowns subjected to PEO treatment with a scanning electron microscope (SEM) it has indeed been noted how the steel of the chains has been spread on the layer of oxide characteristic of the PEO treatment, confirming that fact that the PEO treatment has resulted in an increase in the degree of wear of the inner links of the chain.

The problem linked to the greater wear of the chains is solved in accordance with the present invention by applying the lubricating substance described above on the toothed crowns subjected to a PEO treatment, as for example discussed below in Test 4.

Test 2

The Applicant carried out a series of experimental wear tests on toothed crowns provided with 50 teeth and intended to be used in combination with sprocket assemblies comprising 11 sprockets. In particular, the results obtained through accelerated wear tests in a machine at 1,000,000 cycles (equal to about 5500 Km of road travel) on toothed crowns of the Applicant made of aluminum alloy treated with hard anodizing and toothed crowns of the Applicant made of aluminum alloy subjected to a PEO treatment were compared.

Also in this case the tests highlighted a greater wear of the teeth of the toothed crowns treated with hard anodizing with respect to that of the teeth of the toothed crowns subjected to a PEO treatment. The tests also highlighted a greater wear of the inner links of the chains used with the crowns subjected to a PEO treatment with respect to the other toothed crowns that were tested.

The problem linked to the greater wear of the chains is solved also in this case in accordance with the present invention, i.e. by applying the lubricating substance described above on the toothed crowns subjected to a PEO treatment, as for example discussed below in Test 4.

Test 3

The Applicant has observed that by reducing the number of teeth of the toothed crowns its wear increases, since in order to travel the same number of kilometers the number of rotation cycles of the toothed crown increases (for example by passing from 52 teeth to 30 teeth the number of rotation cycles is almost double).

The Applicant has therefore carried out a series of experimental wear tests on toothed crowns provided with 30 teeth in order to evaluate the performance of different materials and surface treatments. In particular, the results obtained through accelerated wear tests in a machine at 150,000 cycles (equal to about 500 Km of road travel) with maximum crossing of the chain and high torque on toothed crowns of XTR 30T by Shimano made of steel, on toothed crowns of the Applicant made of aluminum alloy treated with hard anodizing and on toothed crowns of the Applicant made of aluminum alloy subjected to a PEO treatment with thicknesses respectively equal to 0.055 mm, 0.045 mm and 0.035 mm were compared.

The tests highlighted a greater resistance to wear of the teeth of the steel toothed crowns and of the teeth of the toothed crowns subjected to a PEO treatment with respect to those of the crowns subjected to hard anodizing.

Also in this case, it has been found a greater wear of the inner links of the chains used with the crowns subjected to a PEO treatment with respect to the other toothed crowns that were tested. However, it has been noted that the teeth of the steel toothed crowns also abraded the coating of the inner links of the chains until the base material was reached.

The problem linked to the greater wear of the chains used with the toothed crowns subjected to a PEO treatment is also in this case solved in accordance with the present invention, i.e. by applying the lubricating substance described above on the toothed crowns subjected to a PEO treatment, as for example discussed in Test 4.

Test 4

The Applicant carried out a series of experimental wear tests on toothed crowns made of aluminum alloy Al 7075 in accordance with the present invention in order to evaluate the performance of a particular surface coating made of a first coating layer 110 having a thickness equal to about 0.040 mm and a second coating layer 120 obtained by applying a lubricating substance as described above after the PEO treatment.

The toothed crowns were subjected to tests of accelerated resistance to corrosion in saline mist. After 400 h the toothed crowns coated only through PEO treatment displayed a distributed corrosion, whereas those subjected to a PEO treatment and to the subsequent application of the lubricating substance in accordance with the present invention did not display corrosion points.

The toothed crowns were also subjected to combined wear tests (road test plus accelerated wear tests in a machine). The results were evaluated after 100 Km on the road and after 200 Km on the road and 2.300.000 cycles in a machine (equal to about 7500 Km on the road).

The tests highlighted that the teeth of the toothed crowns still keep the coating layer 110 after more than 2.000.000 cycles.

A examination of the wear of the inner links of the chains was also carried out after 5000 Km through an analysis with a profilometer. Such analysis highlighted a maximum wear of 0.05 mm of the surface of the inner link of the chains.

Two pieces of chain were tested under traction to verify whether the minimum regulation requirements and the requirements of the Applicant were met and in both cases a positive result was obtained.

The tests discussed above thus highlighted that the application of the lubricating substance after the PEO treatment makes it possible to improve the overall performance of a gear subjected to a PEO treatment, making it possible to reduce the wear of the chain, to improve the resistance to corrosion and the aesthetic finish, as well as eliminating the risk of "chainsuck", reducing the noise during the engagement of the teeth with the chain, increasing the smoothness of the transmission of motion between gear and chain and eliminating, or at least drastically reducing, the burden of periodic cleaning of the gear to remove the dirt held on the surfaces of the gear.

Of course, those skilled in the art can bring numerous modifications and variants to the present invention in order to satisfy specific and contingent requirements, such modifications and variants being in any case all within the scope of protection defined by the following claims.

What is claimed is:

1. A bicycle gear, comprising a toothed annular element having a first coating layer obtained by subjecting said toothed annular element to a plasma electrolytic oxidation treatment, and a second coating layer that overlaps said first coating layer and is comprised of an organic polymer and an organic matrix binder selected from the group comprised of acrylics, epoxies, polyesters, and polyurethanes.

2. The bicycle gear according to claim 1, wherein said second coating layer comprises an anti-corrosive substance.

3. The bicycle gear according to claim 2, wherein said organic polymer is an anti-corrosive substance.

4. The bicycle gear according to claim 1, wherein said organic polymer comprises a fluoropolymer.

5. The bicycle gear according to claim 1, wherein said gear is a toothed crown of a bicycle crankset.

6. The bicycle gear according to claim 5, wherein said toothed crown is made of a non-ferrous metallic material.

7. The bicycle gear according to claim 1, wherein the first coating layer has a thickness comprised between about 0.010 mm and about 0.080 mm.

8. The bicycle gear according to claim 1, wherein the second coating layer has a thickness comprised between about 0.005 mm and about 0.10 mm.

9. The bicycle gear according to claim 1, wherein said toothed annular element comprises a plurality of mutually identical first teeth and a plurality of mutually identical second teeth are different from the plurality of mutually identical first teeth, and each second tooth is interposed between two first teeth.

10. The bicycle gear according to claim 7, wherein the second coating layer has a thickness less than the thickness of the first coating layer.

\* \* \* \* \*